United States Patent
Hoegberg

(10) Patent No.: US 10,762,027 B2
(45) Date of Patent: Sep. 1, 2020

(54) METHOD AND SYSTEM FOR OUTPUT LATCH BASED DATA BUS FAILURE MITIGATION

(71) Applicant: Hamilton Sundstrand Corporation, Charlotte, NC (US)

(72) Inventor: Lon R. Hoegberg, Belvidere, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 195 days.

(21) Appl. No.: 15/952,669

(22) Filed: Apr. 13, 2018

(65) Prior Publication Data
US 2019/0317915 A1  Oct. 17, 2019

(51) Int. Cl.
*G06F 11/00* (2006.01)
*G06F 13/42* (2006.01)
*G06F 11/07* (2006.01)

(52) U.S. Cl.
CPC ........ *G06F 13/4221* (2013.01); *G06F 11/079* (2013.01); *G06F 11/0745* (2013.01)

(58) Field of Classification Search
CPC . G06F 11/0745; G06F 11/079; G06F 13/4221
See application file for complete search history.

(56) References Cited

U.S. PATENT DOCUMENTS

| | | | |
|---|---|---|---|
| 4,672,570 A | 6/1987 | Benken | |
| 5,469,473 A * | 11/1995 | McClear | H04L 5/16 370/447 |
| 5,511,170 A | 4/1996 | Abdoo | |
| 5,627,839 A | 5/1997 | Whetsel | |
| 5,954,825 A | 9/1999 | Kaiser et al. | |
| 5,999,867 A | 12/1999 | Rogers et al. | |
| 6,128,746 A | 10/2000 | Clark et al. | |
| 2008/0059142 A1 * | 3/2008 | Chlipala | G06F 17/5036 703/14 |
| 2008/0150577 A1 * | 6/2008 | Ueno | H03K 3/356165 326/33 |
| 2011/0062990 A1 * | 3/2011 | Yamada | H03K 3/012 326/62 |
| 2013/0195153 A1 * | 8/2013 | Pimentel | H04L 5/1492 375/219 |
| 2019/0081870 A1 * | 3/2019 | Schirck | H04L 43/00 |

FOREIGN PATENT DOCUMENTS

| | | |
|---|---|---|
| DE | 10213172 | 10/2003 |
| EP | 1746514 | 1/2007 |
| GB | 1593762 | 7/1981 |

OTHER PUBLICATIONS

The Extended European Search Report for EP Application No. 19168624.5, dated Jul. 29, 2019.

* cited by examiner

*Primary Examiner* — Joshua P Lottich
(74) *Attorney, Agent, or Firm* — Carlson, Gaskey & Olds, P.C.

(57) ABSTRACT

A data bus system includes a processor having a data output and a transceiver connecting the data output to a data bus. The transceiver includes a bus-hold circuit configured to maintain a latest value of the data output. At least one output latch connects the data bus to at least one corresponding controlled system.

15 Claims, 1 Drawing Sheet

METHOD AND SYSTEM FOR OUTPUT LATCH BASED DATA BUS FAILURE MITIGATION

TECHNICAL FIELD

The present disclosure relates generally to data bus systems, and more particularly to a failure mitigation system for the same.

BACKGROUND

Data buses are frequently used to facilitate communication between multiple devices within a computer or controller system. A data bus provides for the transmission of bits of data between a sending device, such as a microprocessor or other controller, and at least one receiving or controlled device. In some examples, data buses are parallel buses, which carry data words in parallel on multiple wires. Alternatively, data buses can utilize multiplexing to output multiple control instructions sequentially to controlled devices over a single data bus. In such an example, each controlled device or receiving device includes logic for determining the appropriate timing to read data on the data bus as an instruction for the controlled device. When a failure in the system causes inaccurate signals to be provided to the data bus, the receiving or controlled devices can receive incorrect instructions, and other data passed along the data bus can be distorted or otherwise damaged.

SUMMARY OF THE INVENTION

In one exemplary embodiment a data bus system includes a processor including a data output, a transceiver connecting the data output to a data bus wherein the transceiver includes a bus-hold circuit configured to maintain a latest value of the data output, and at least one output latch connecting the data bus to at least one corresponding controlled system.

In another example of the above described data bus system the processor includes instructions for causing the processor to sequentially output a number of data values equal to a number of controlled systems connected to the data bus plus one.

In another example of any of the above described data bus systems a last of the data values in the sequential output is a failure state value.

In another example of any of the above described data bus systems the failure state value is a fail-safe value.

In another example of any of the above described data bus systems the failure state value is a fail-desired value.

In another example of any of the above described data bus systems the at least one controlled device is a plurality of controlled devices connected to the data bus.

In another example of any of the above described data bus systems in at least one of the controlled devices in the plurality of controlled devices is one of a relay and a contactor.

In another example of any of the above described data bus systems each of the controlled devices in the plurality of controlled devices is one of a relay and a contactor.

An exemplary method for mitigating an output latch failure mode includes providing a failure mode value to a transceiver bus-hold circuit, and passing the failure mode value to an output latch input from the transceiver through a bus when no driven values are received at the transceiver.

Another example of the above described exemplary method for mitigating an output latch failure mode further includes providing a set of control signals to the transceiver prior to providing the failure mode value to the transceiver bus-hold circuit.

In another example of any of the above described exemplary methods for mitigating an output latch failure mode each of the control signals in the set of control signals is provided to the bus-hold circuit.

In another example of any of the above described exemplary methods for mitigating an output latch failure mode the failure mode value is a fail-safe value.

In another example of any of the above described exemplary methods for mitigating an output latch failure mode the failure mode value is a fail desired value.

Another example of any of the above described exemplary methods for mitigating an output latch failure mode further includes storing the failure mode value in the transceiver bus-hold circuit until a next scheduled control signal output from a microprocessor.

Another example of any of the above described exemplary methods for mitigating an output latch failure mode further includes storing the failure mode value in the transceiver bus-hold circuit until a next driven control signal output from a microprocessor.

These and other features of the present invention can be best understood from the following specification and drawings, the following of which is a brief description.

DETAILED DESCRIPTION OF AN EMBODIMENT

Figure 1:
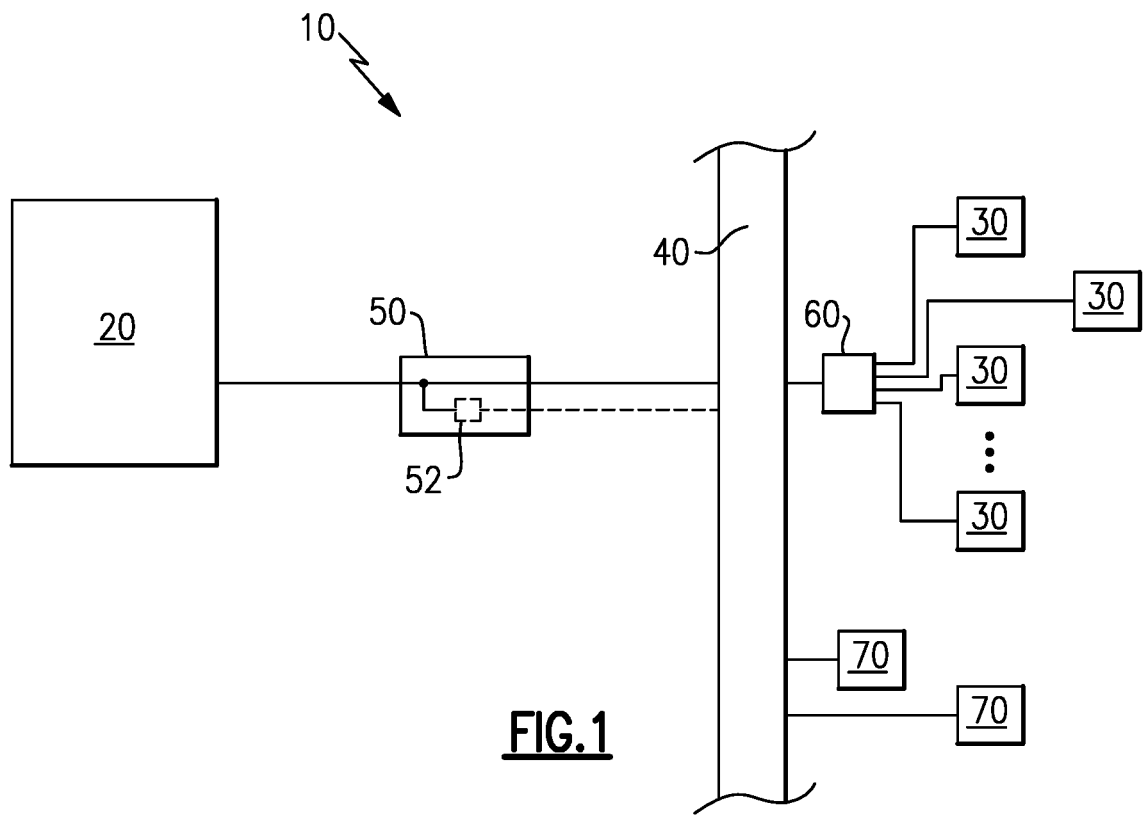
FIG. 1 schematically illustrates an exemplary data bus communication system according to a first example.

FIG. 1 schematically illustrates a data bus communication system 10 including a microprocessor 20 configured to communicate with multiple controlled systems 30 via a data bus 40. The microprocessor 20 is connected to the data bus 40 via a transceiver 50 and an output latch 60. In some examples, the data bus communication system 10 can include additional microprocessors, and additional controlled systems 30. In such examples, control signals from each microprocessor are scheduled to avoid interference.

The exemplary system 10 outputs digital data to the data bus 40 from the microprocessor 20 through the transceiver 50 and to one or more latches 60. In some examples, the data bus 40 is also used to communicate with one or more other devices 70. The digital data is provided from microprocessor 20 to the data bus 40 to the various controlled systems 30 via the corresponding latch 60 or the various device(s) 70 according to any bus communication protocol. In some examples, the additional devices 70 provide data back to the microprocessor 20 via the data bus 40 and the transceiver 50. In some examples, the controlled systems 30 can be relays or contactors, with the digital data provided to the controlled system 30 controlling an open or closed state of the relays or contactors. The input of each latch 60 is connected to the data bus 40 and latches an output value to be provided to the controlled systems 30 using the appropriately timed data driven out from the microprocessor 20. This latched valve is maintained indefinitely, by the latch 60 even when the data bus 40 contains other data.

It is possible, due to some types of system failures, for the output latch 60 to enter a failure mode. One exemplary failure mode is referred to as a transparent failure mode and causes the output latch 60 to always pass the input received from the data bus 40 rather than maintaining the desired latched output value. While the microprocessor 20 is actively driving the output data for the latch 60, this failure mode is typically inconsequential. However, when the microprocessor 20 is outputting data to the other devices 70 or inputting data from the other device 70 a transparent failure mode of a latch 60 can result in incorrect control values being passed to the controlled system 30 connected to the failed latch 60.

In order to mitigate the effect of the transparent failure mode in the latch 60, the system 10 of FIG. 1 includes a bus-hold circuit 52 within the transceiver 50. The bus-hold circuit 52 reads the value passed through the transceiver 50 and holds the output of the transceiver 50 at the most recently received value on the bus. When the latch 60 is in a transparent failure mode and the microprocessor 20 is not causing data to be on the data bus 40, the value of the bus-hold circuit 52 is passed to the controlled systems 30, rather than an undefined or fixed value as in current art.

In typical control operations, the microprocessor 20 will cause N values to be sequentially driven onto the data bus 40 followed by an inactive period, where N is the total number of data transfers between the microprocessor 20 and the various devices 30 and 70 on the data bus 40. During the inactive period, no control signals are driven by the microprocessor 20 and the data bus 40 will maintain the most recent value using the bus hold feature 52. In alternative examples, the number of values transmitted can be uncorrelated to the number of controlled devices 30. In such a case, the failure mode value is the value transmitted immediately prior to an idle period, and after the last control value is transmitted.

Generally the output latch 60 component contains individual latches up to a quantity of latches equal to the number of bits that can be transmitted over the bus (alternatively referred to as the bus width). Further, in alternative examples additional latches 60 can be included, with each additional latch 60 having its own set of controlled devices 30. In such an example, the failure mitigation system is designed to mitigate the failure mode of one specific latch 60, and not every connected latch 60. It is envisioned that in some instances, where the desired failure mode of multiple latches 60 is the same, the failure mode mitigation process could be beneficial to all the latches with the same desired failure state.

When implementing the failure mode mitigation system 10 illustrated in FIG. 1, the microprocessor 20 sequentially drives an additional value, N+1 value, onto the data bus 40, with the last driven value (the N+1th) being the desired failure mode value for the output latch 60 that results in the controlled systems 30 being in the desired state. While the output latch 60 is healthy, the output latch 60 ignores the N+1th value, and the failure mode value is not passed to the controlled systems 30. While the output latch 60 is in the transparent failure mode, the N+1th value will be passed to the controlled systems 30 during the idle time.

While described above as utilizing N control values, one of skill in the art will appreciate that instead of just repeating a fixed number of N values, any number of combinations of values can be used. The failure mitigation method will work with any arrangement of values as long as the bus hold value during the idle time is set to the desired failure mode value.

In alternative examples, bus-hold circuit 52 within the transceiver 50 will not hold the most recently received value but a value specified by the microprocessor 20. In this implementation, the microprocessor 20 will cause N values to be sequentially driven onto the data bus 40 followed by an inactive period, where N is the total number of data transfers between the microprocessor 20 and the various devices 60 and 70 on the data bus 40. After completing all N values, the microprocessor 20 commands the bus hold value 52 within the transceiver 50 to the desired failure mode value for the output latch 60 that results in the controlled systems 30 being in the desired state. While the output latch 60 is healthy, the output latch 60 ignores the bus hold value, and the failure mode value is not passed to the controlled systems 30. While the output latch 60 is in the transparent failure mode, the bus hold value will be passed to the controlled systems 30 during the idle time.

When the output latch 60 enters a transparent failure mode, as described above, the input received at the output latch 60 is passed through, and the failure mode value N+1 is provided to the controlled systems 30 when other data is not being transferred on the data bus (the idle period). It is appreciated that the failure mode value can be set at one of two types of values. The first type of value is a fail-safe value which causes the failure value provided to the controlled systems 30 to be in a safe state. The second type of value is a fail-desired value, which causes the value provided to the controlled systems 30 to be in the state that is desired by the microprocessor 20.

A fail-safe value is typically a value that results in the least damaging form of interference to the systems 30. In contrast, a fail desired value is the normal value, allowing for continued operation of one or more controlled systems 30. It is envisioned that in a least some examples, the fail-safe value and the fail-desired value can be the same value. The effectiveness of this method depends on the amount of time the microprocessor 20 takes to cause the N+1 values to be driven on the bus compared to the idle time between iterations and the sensitivity of the controlled system 30 to the incorrect values that will be output during part of the N time.

Figure 2:
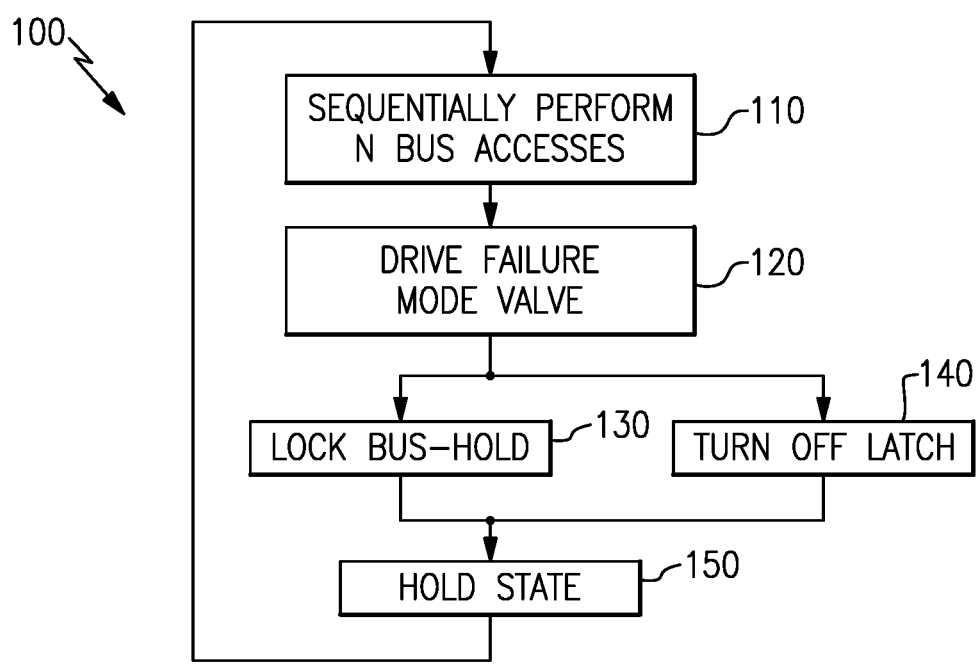
FIG. 2 schematically illustrates a method for operating the data bus communication system of FIG. 1 including a process for mitigating failure of an output latch

With continued reference to the system 10 of FIG. 1, FIG. 2 illustrates a method 100 of operating the system 10. Initially the microprocessor 20 performs N data bus 20 accesses in a "Sequentially Perform N Bus Accesses" step 110. Each access results in a data value being driven onto the data bus 40 for a predetermined amount of time sufficient for the microprocessor 20, or a latch 60 or the additional devices 70, to read and implement the data value.

Once the N data values have been driven, the microprocessor 20 drives a failure mode value in a "Drive Failure Mode Value" step 120. The failure mode value is provided to the bus-hold circuit 52 within the transceiver 50, and is driven for the same period of time as one of the previous N data values. In response to receiving the failure mode value, the bus-hold circuit 52 in the transceiver 50 locks in the failure mode value in a "Lock Bus-Hold" step 130. If the latch 60 is healthy, the failure mode value held in the transceiver 50 bus hold circuit 52 will have no effect on the output of the latch 60. However, if the latch 60 has failed transparent, the failure mode value held in the transceiver 50 bus hold circuit 52 will be seen on the output of the latch 60 and sent to the controlled system 30.

Once the bus-hold circuit 52 has been locked, the method 100 holds the current state of both the bus-hold circuit 52 and the latch 60 input in a "Hold State" step 150. The state of both the bus-hold circuit 52 and the latch 60 input is held until the next scheduled control transmission. When the next scheduled control transmission comes due, the method 100 returns to the "Sequentially Perform N Bus Accesses" step 110 and repeats.

By using the bus-hold circuit 52 to maintain a failure mode value in the event of a transparent latch failure, the system 10 and the method 100 can ensure either desired or safe operations of the connected control systems 30.

While described above as utilizing N control values, one of skill in the art will appreciate that the driven control values can be a simple high or low value in some examples, a range of values in other examples, and a sequence of values providing a more complex instruction in yet further examples. Regardless of the type of control value passed during the N data values, the bus-hold circuit 52 based failure mitigation described above can be applied.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A data bus system comprising;
   a processor including a data output;
   a transceiver connecting the data output to a data bus wherein the transceiver includes a bus-hold circuit configured to maintain a latest value of the data output; and
   at least one output latch connecting the data bus to at least one corresponding controlled device; and
   wherein the processor is configured to provide a failure mode value to the bus-hold circuit, and pass the failure mode value to the at least one output latch from the transceiver through a bus when no driven values are received at the transceiver.

2. The data bus system of claim 1, wherein the at least one controlled device is a plurality of controlled devices connected to the data bus.

3. A data bus system comprising;
   a processor including a data output;
   a transceiver connecting the data output to a data bus wherein the transceiver includes a bus-hold circuit configured to maintain a latest value of the data output;
   at least one output latch connecting the data bus to at least one corresponding controlled system; and
   wherein the processor includes instructions for causing the processor to sequentially output a number of data values equal to a number of controlled systems connected to the data bus plus one.

4. The data bus system of claim 3, wherein a last of the data values in the sequential output is a failure state value.

5. The data bus system of claim 4, wherein the failure state value is a fail-safe value.

6. The data bus system of claim 4, wherein the failure state value is a fail-desired value.

7. A data bus system comprising;
   a processor including a data output;
   a transceiver connecting the data output to a data bus wherein the transceiver includes a bus-hold circuit configured to maintain a latest value of the data output;
   at least one output latch connecting the data bus to a plurality of corresponding controlled devices; and
   wherein in at least one of the controlled devices in the plurality of controlled devices is one of a relay and a contractor.

8. The data bus system of claim 7, wherein each of the controlled devices in the plurality of controlled devices is one of a relay and a contractor.

9. A method for mitigating an output latch failure mode comprising:
   providing a failure mode value to a transceiver bus-hold circuit; and
   passing the failure mode value to an output latch input from the transceiver through a bus when no driven values are received at the transceiver.

10. The method of claim 9, further comprising providing a set of control signals to the transceiver prior to providing the failure mode value to the transceiver bus-hold circuit.

11. The method of claim 10, wherein each of the control signals in the set of control signals is provided to the bus-hold circuit.

12. The method of claim 9, wherein the failure mode value is a fail-safe value.

13. The method of claim 9, wherein the failure mode value is a fail desired value.

14. The method of claim 9, further comprising storing the failure mode value in the transceiver bus-hold circuit until a next scheduled control signal output from a microprocessor.

15. The method of claim 9, further comprising storing the failure mode value in the transceiver bus-hold circuit until a next driven control signal output from a microprocessor.

* * * * *